United States Patent

[11] 3,627,782

[72] Inventor Theodore Largman
 Morristown, N.J.
[21] Appl. No. 832,832
[22] Filed June 12, 1969
[45] Patented Dec. 14, 1971
[73] Assignee Allied Chemical Corporation
 New York, N.Y.

[54] SYNTHESIS OF GRAMINE SALT OF NITROACETATE ESTERS
 2 Claims, No Drawings
[52] U.S. Cl. .................................................... 260/326.15,
 260/326.13 R, 260/326.14 T
[51] Int. Cl. ........................................................ C07d 27/56
[50] Field of Search ............................................ 260/326.14
 T, 326.15

[56] References Cited
UNITED STATES PATENTS
2,557,041 6/1951 Weisblat et al. ............... 260/326.14 X Primary Examiner—Alex Mazel
Assistant Examiner—Joseph A. Narcavage
Attorneys—Arthur J. Plantamura and Stanley M. Teigland ABSTRACT: Tryptophan, an essential amino acid, is prepared from gramine and an ester of nitroacetic acid by combining gramine and the ester in an inert solvent maintained at about room temperature to form the corresponding salt, and then heating the salt in solution to convert it to the corresponding ester of $\alpha$-nitro-$\beta$-(3-indole) propionic acid, which is reduced and hydrolyzed in accordance with conventional methods to afford tryptophan. The salt is a novel compound.

SYNTHESIS OF GRAMINE SALT OF NITROACETATE ESTERS

BACKGROUND OF THE INVENTION

This invention relates to an improved process for preparing tryptophan. The process includes the step of preparing the gramine salt of an ester of nitroacetic acid, which is a novel compound.

There are eight amino acids which are essential to human nutrition. They are essential because they are required for the growth and repair of tissue and they cannot be synthesized by the body. Hence, they must be supplied in the diet. A lack of these amino acids in the diet results in malnutrition, and it has been estimated that the diet of over half the world's population is lacking in these compounds. However, these amino acids can be synthesized chemically and used to overcome nutritional deficiency, but this use has been limited because of the high cost of synthesizing these compounds. Hence, it is desirable to develop improved methods of synthesizing these essential amino acids in order to reduce their cost.

One of these eight essential amino acids is tryptophan. A method for producing tryptophan is described in Lyttle and Weisblat, J. Am. Chem. Soc. 69, 2118 (1947) and in U.S. Pat. No. 2,557,041, to Lyttle and Weisblat. The method described in these two references involves reacting gramine with an ester of nitroacetic acid to obtain the corresponding ester of $\alpha$-nitro-$\beta$-(3-indole) propionic acid, which is catalytically reduced and hydrolyzed to afford tryptophan at a yield of about 45 percent based on gramine. This method of synthesizing tryptophan is generally regarded as one of the most favorable routes to tryptophan.

SUMMARY OF THE INVENTION

This invention provides a process for preparing the gramine salt of an ester of nitroacetic acid, which represents a class of novel compounds useful as intermediates in the preparation of tryptophan.

Lyttle and Weisblat teach that when gramine and an ester of nitroacetic acid are combined in an inert solvent and the temperature is raised to about 90° C., the product obtained is the corresponding ester of $\alpha$-nitro-$\beta$-(3-indole) propionic acid. I have also found that if the temperature is not raised, but rather is allowed to remain at about room temperature, the salt of gramine and the ester is formed and can be readily recovered at a yield of 100 percent. The reaction leading to the formation of the salt is illustrated by the following equation:

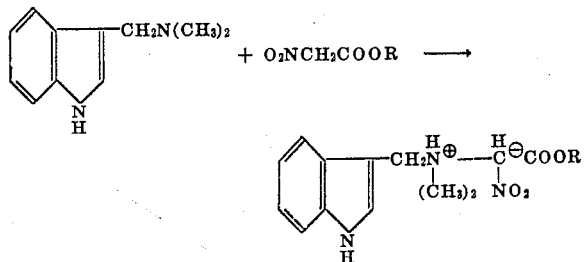

The ester group, designated R, does not participate in the reaction and hence is not critical. Good results are obtained where R is lower alkyl, phenyl or lower alkyl substituted phenyl.

The salt is obtained by adding gramine and an ester of nitroacetic acid, preferably in substantially equimolar quantities, to an inert solvent at about room temperature, allowing the salt to precipitate and recovering the salt from the solvent by conventional methods, such as by filtration, centrifugation, etc.

The discovery that gramine and an ester of nitroacetic acid combine to form a salt is surprising in and of itself, and is especially surprising in view of the Lyttle and Weisblat references which do not appreciate this phenomenon and which suggest, by negative inference, that a salt would not be formed.

In order to form the salt, it is critical that the temperature of the solution be maintained at less than about 40° C. At temperatures above 90° C., the reactants combine to form the corresponding ester of $\alpha$-nitro-$\beta$-(3-indole) propionic acid, as disclosed in the Lyttle and Weisblat references. Temperatures lower than room temperature can be used, but there is no advantage in doing so.

The salt is useful as an intermediate in the preparation of tryptophan. When the salt is heated in an inert solvent at from about 90° to about 115° C., the corresponding ester of $\alpha$-nitro-$\beta$-(3-indole) propionic acid is formed at a yield which approaches 100 percent. At temperatures below about 90° C., the reaction is very slow, and at temperatures above about 115° C. undesirable side reactions occur. Conversion of the salt to the corresponding ester of $\alpha$-nitro-$\beta$-(3-indole) propionic acid is illustrated by the following equation:

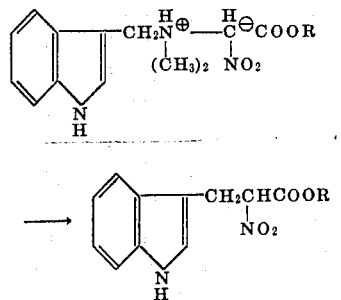

The product of this reaction is sufficiently pure that it can be reduced and hydrolyzed directly, i.e., in the same solvent system without interim recovery, to afford tryptophan, which can thus be prepared in a continuous process from the salt. Using this process, tryptophan can be recovered at a yield of up to 80 percent or more based on gramine. The reduction and hydrolysis steps are performed according to methods known in the art, e.g., as disclosed in the Lyttle and Weisblat references previously referred to herein.

In a third reference, J. Am. Chem. Soc., 71, 3079 (1949), Lyttle and Weisblat indicate that when the $\alpha$-nitro-$\beta$-(3-indole) propionate ester is prepared directly from gramine and a nitroacetate ester, dialkylation of the nitroacetate ester by gramine is an undesirable side reaction which reduces the yield of the $\alpha$-nitro-$\beta$-(3-indole) propionate ester and results in a less pure product. For this reason, Lyttle and Weisblat appear to prefer to use a nitromalonate ester instead of a nitroacetate ester even though the use of the nitromalonate ester requires an additional step, viz, decarboxylation, in the overall process of preparing tryptophan. Furthermore, esters of nitroacetic acid are obtainable at a lower cost per mol than esters of nitromalonic acid. In preparing $\alpha$-nitro-$\beta$-(3-indole) propionate esters from the salt of gramine and an ester of nitroacetic acid, dialkylation is substantially avoided, thus permitting the use of the more preferred nitroacetate esters. Dialkylation is avoided because the two ions which comprise the salt are associated in solution as a result of ionic attraction and are associated in a one-to-one relationship. Hence, as dimethylamine is driven off by heat, a nitroacetate group is immediately present to combine with the 3-methylindole residue. Dialkylation does not occur because in order for it to occur the $\alpha$-nitro-$\beta$-(3-indole) propionate molecule would have to attract a gramine cation away from a nitroacetate anion, which is not likely to occur.

In addition to avoiding dialkylation, another advantage of preparing the salt as an intermediate is that it enables one to purify the initial reactants and combine them in a precisely one-to-one molar ratio. Nitroacetate esters are not available commercially. They are normally prepared by treating nitromethane with concentrated potassium hydroxide and then esterifying the resulting dipotassium salt of nitroacetic acid. The esterified product is normally obtained as a residue with an appreciable amount of impurities. The nitroacetate ester can be readily separated from these impurities by dissolving the residue in an inert solvent, adding gramine and precipitating the salt of gramine and the nitroacetate ester, which can be recovered and purified by simple washing or reprecipitation. Hence, it is preferred, in an overall process of preparing tryptophan, to recover or isolate the salt prior to converting it to the α-nitro-β-(3-indole) propionate ester.

The inert solvent employed in preparing the salt and the α-nitro-β-(3-indole) propionate ester is preferably nonpolar and includes straight-chain and cyclic saturated hydrocarbons, and ethers. Toluene is typical and gives good results.

The invention is further illustrated by the following example.

EXAMPLE

Preparation of Ethyl Nitroacetate

In a 2-liter flask was placed 1,410 grams of 15.9 percent solution of potassium hydroxide in n-butanol. Nitrogen was passed through the system as nitromethane (62 grams, 1.0 mole) was added dropwise with vigorous stirring over a 50-minute period. The temperature rose from 25° to 50° C. during the addition. The mixture was then refluxed overnight. After cooling, the n-butanol was removed by decantation and the remaining solids were purified by warming to 80° C. with 800 grams of 50 percent potassium hydroxide in n-butanol. The mixture was cooled, filtered, and the cake was washed with methanol. 63.3 grams of dry salt were recovered. The procedure was repeated and an additional 66.9 grams of salt were recovered.

Ethanol (1,000 ml.) was saturated with HCl (160 grams) and cooled to −10° C. Over a 50-minute period, 129.5 grams of the dipotassium salt of nitroacetic acid was added to the solution while maintaining the temperature at −10° to −12° C. Stirring at −10° C. was continued for 2 additional hours, after which the mixture was placed in a freezer overnight. The reaction was completed by a final stirring for 3 hours at 20°−25° C., followed by filtration to remove potassium chloride. The filtrate was diluted with an equal volume of water and extracted four times with 200 ml. portions and three times with 100 ml. portions of dichloroethylene. After drying overnight over 10 grams of MgSO$_4$, the volatiles were flashed off under reduced pressure, leaving 97 grams of residue that contained 82 percent (vapor phase chromatographic analysis) of ethyl nitroacetate, for an overall yield of 60 percent based on nitromethane.

Preparation of Salt of Gramine and Ethyl Nitroacetate 7.2 grams (0.0444 mole) of the ethyl nitroacetate prepared above and 8.7 grams (0.05 mole) of gramine were stirred together at room temperature in 100 C. toluene for 1 hour. The precipitate was filtered off and dried in a vacuum at 40° C., and 1 mm. Hg. 13.9 grams of product, m.p. 74°–75° C., were obtained. Infrared and NMR analyses indicated that the product was the gramine salt of ethyl nitroacetate. A thin layer chromatographic analysis of the salt showed only one spot, indicating its purity.

Preparation of Tryptophan 7.7 grams (0.025 mole) of the gramine-ethyl nitroacetate salt prepared above were dissolved in 100 ml. toluene. The solution was refluxed overnight under a stream of nitrogen. The off gases were passed through a scrubber containing 0.025 mole of acetic acid. 0.0248 mole, representing 99 percent of theory, of dimethyl amine was trapped in the scrubber. A thin-layer chromatographic analysis of the reaction mixture showed only one spot. The solution was diluted with an additional 200 ml. of toluene and charged to an autoclave together with 1.0 gram 5 percent palladium on carbon. Reduction was complete after the mixture was stirred for 4.5 hours at 600 p.s.i. hydrogen and 80° C. A thin-layer chromatographic analysis of the filtered solution showed one major spot corresponding to ethyl α-amino-β-(3-indole) propionate. Dry HCl gas was passed through the chilled solution until the amine was completely precipitated. The precipitate was collected by filtration and dried. The product weighed 5.7 grams for a yield of 85 percent. 2.69 grams (0.01 mole) of the product was dissolved in 8 ml. of 20 percent sodium hydroxide and 25 ml. ethanol. After being stirred for 1 day at room temperature, the solution was acidified with glacial acetic acid to pH 5.9. The mixture was chilled for 2 hours at 0° C. and the product was recovered by filtration. There was thus obtained 1.62 grams of tryptophan, m.p. 276°–278° C. Analysis indicated that an additional 0.28 gram of tryptophan was present in the filtrate. The overall yield of tryptophan, including the tryptophan present in the filtrate, was thus 79 percent based on gramine.

I claim:

1. A process for preparing a gramine salt of an ester of nitroacetic acid having the formula

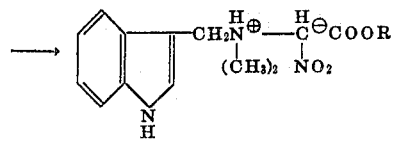

wherein R is lower alkyl, phenyl or lower alkyl substituted phenyl, which process comprises adding gramine and an ester of nitroacetic acid having the formula $O_2NCH_2COOR$, wherein R is as defined above, to an inert solvent at a temperature maintained at less than 40° C., allowing the salt to precipitate from the solvent and recovering the salt.

2. A gramine salt of an ester of nitroacetic acid having the formula

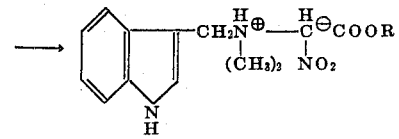

wherein R is a lower alkyl, phenyl or lower alkyl substituted phenyl.

* * * * *